H. M. CAHILL.
BASKET FOR GROWING PLANTS.
APPLICATION FILED OCT. 13, 1908.
994,816.
Patented June 13, 1911.
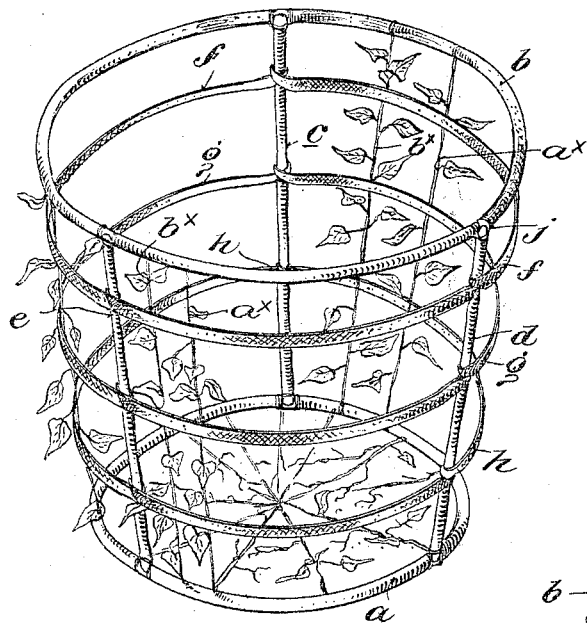
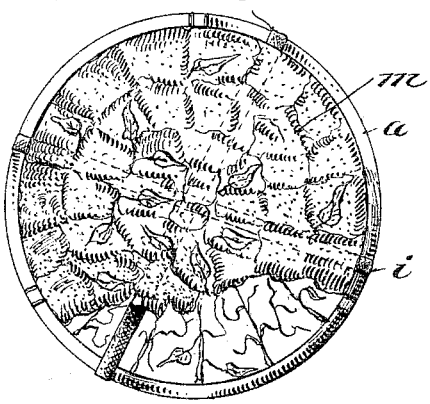
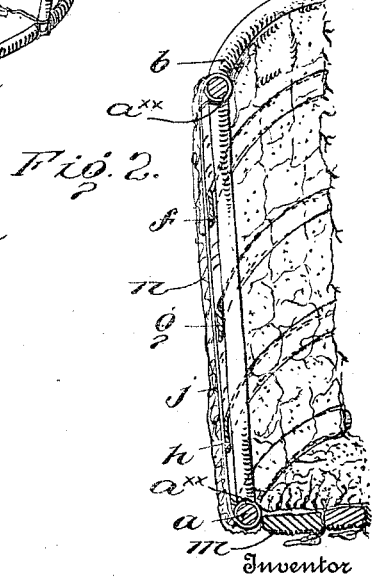
Inventor
H. M. Cahill.
Witnesses
By
Attorney

UNITED STATES PATENT OFFICE.

HELEN M. CAHILL, OF OREGON CITY, OREGON.

BASKET FOR GROWING PLANTS.

994,816.

Specification of Letters Patent. Patented June 13, 1911.

Application filed October 13, 1908. Serial No. 457,565.

*To all whom it may concern:*

Be it known that I, HELEN M. CAHILL, a citizen of the United States, residing near Oregon City, in the county of Multnomah and State of Oregon, have invented a new and useful Basket for Growing Plants, of which the following is a specification, reference being had to the accompanying drawings.

This invention has for its object to obtain a basket which shall be especially adapted to the transplanting of native forestry, and other growing plants; and which is built in the greater part of material furnishing nutriment to the plant put therein, and which is stimulating to the growth thereof.

Incidentally, my invention also has for its object to obtain a basket, for the purpose mentioned, which shall give esthetic effects by being itself built of growing plants.

I attain my object by making the body of my basket of salal or other suitable, growing vine, twined and secured to a skeleton frame of more rigid material, and filling in the spaces with sheets of growing moss, secured in place and arranged as hereinafter fully described.

In the drawings: Figure 1 is a partial elevation, in perspective, of a basket built by me for carrying out my invention; Fig. 2 is a detail of construction of such basket, on larger scale; and Fig. 3 shows an inverted bottom view of my basket.

In order to fully instruct others in the utilities of my invention, I will describe the same as applied to its different purposes. In the first place, I will describe the construction of my basket to make the same serviceable in the transplanting of native forestry, domestic shrubs, plants, etc.

The upper and lower rings or hoops $a$ and $b$ are preferably formed of pieces of salal vine with its roots, the ends being tied or otherwise secured together. The lateral branches $b^x$ of the upper hoop are brought down and secured to the lower hoop, while the lateral branches $a^x$ from the lower hoop are carried up to and secured to the upper hoop.

Suitably spaced apart sticks $c$, $d$ and $e$ of limbs of a green tree or bush are interposed between the hoops $a$ and $b$, the ends of the sticks being formed with V-shaped notches $a^{xx}$ in which said hoops are snugly seated. The sticks are tied to the hoops by wire, indicated at $j$ in order to form the whole into a substantial frame. To horizontally reinforce the frame, bands $f$, $g$, and $h$ preferably made of burlap, are wound around the sticks, looped around the lateral branches, and secured in any suitable manner. The roots of the vines of the bottom hoop $a$ are extended across the latter, and secured as shown in Fig. 3. To these extended branches are secured strips of moss indicated at $m$. To further reinforce the bottom, bands $i$ and $i'$ preferably burlap, extend across the bottom and are secured to the hoop $a$.

Secured to the outer surface of the frame described, is a layer of moss $n$, so arranged that the root surface is on the inside next to the lateral branches $a^x$ and $b^x$. To further hold this layer of moss in place, and to make the structure more stable, the vertically arranged branches of the vines are drawn outwardly through the said moss.

The moss walls of the basket, because of possessing the property of retaining moisture, promote the growth of the tree; and when the roots of the tree have extended to the moss wall, they may penetrate it without hindrance into the surrounding soil in which the basket and tree are planted.

In the process for transplanting, I dig up large salal shrubs, or any other nice flowering shrub, with enough dirt around the roots for the first year's growth. I dig up these shrubs in their dormant state. Snow-drop shrubs are also very beautiful for these purposes. I also plant snow-drop, salal, or other vines, through the sides of the basket, with the roots inside the latter. I then set the basket down by the running brook in the shade for at least three or four months, or spray the basket often with water, so as to cause the growth of the shrubs and plants; and the growth of the moss will be established at the same time. The basket is then ready for shipment. At final planting it must be set in a low, wet place in the yard when the soil is soft, so that the soil and moisture will work up through the bottom of the basket, to facilitate which open places should be left in the bottom of the basket.

This basket is well adapted to the transplanting of dormant shrubbery, such as rose bushes, snowballs or ornamental shrubs, Easter lilies, tulips, etc. My basket is well adapted for transplanting native trees and forest bulbs, etc., also as a growing moss basket, for transplanting native shrubs.

My basket is also splendidly suited to be used as a hanging basket. When so used, the growing vines and moss of the basket greatly enhance the appearance of the same as a whole; for it is certainly much more pleasing to see the basket itself constructed of growing material, than one made simply of dead wire frame. Furthermore, the moss will grow to and entwine, as it were, its rootlets around the vine used in making the frame of my basket, while in the use of a mere wire frame such effect cannot be obtained.

The basket is strengthened, where required for heavy work, by making a stick with notched ends and arranging the same transversely in the bottom ring of my basket, said bottom ring bearing in the notches of the stick; and I tie the parts together with spool wire, passed from one side to the other of the ring, so as to secure the same firmly in the notches of said transverse stick. The upright frame members of the basket should also be securely tied in place with wire. By so doing the strength of the basket is materially increased. The exterior envelop of moss also serves to protect the vine-branches, interwoven in the sides or walls of the basket, against injury.

I claim:

1. A basket for transplanting plants, comprising a skeleton-frame consisting of top and bottom hoops made from the stalks of growing shrubs having extended roots and branches and perpendicularly arranged spacing-member to which the hoops are secured, an exterior sheeting of pieces of moss fastened to the frame structure, the roots and branches of the top and bottom hoops being intermeshed, and the exterior sheeting of moss being arranged with its root surface inward.

2. A basket for transplanting plants, comprising a skeleton-frame consisting of top and bottom hoops made from the stalks of growing shrubs having extended roots and branches, and vertically arranged spacing-members to which the hoops are secured, bands of textile fabric arranged on said frame structure to reinforce the same, an exterior sheeting of pieces of moss fastened to the frame structure, the roots and branches of the hoops being intermeshed, and the exterior sheeting of moss being arranged with its root surface inward.

3. A basket for transplanting plants comprising a skeleton frame of plant stems with roots attached, walls made of growing moss, and reinforcing members arranged to give rigidity to the structure, the roots on the stems of the plants and the root surfaces of the moss-wall being arranged inward.

HELEN M. CAHILL.

Witnesses:
 LETHA L. JACKSON,
 L. E. MILLER.